No. 654,554. Patented July 24, 1900.
W. SCHMIDT.
CALCULATOR FOR EDUCATIONAL PURPOSES.
(Application filed Nov. 6, 1899.)
(No Model.) 2 Sheets—Sheet 1.
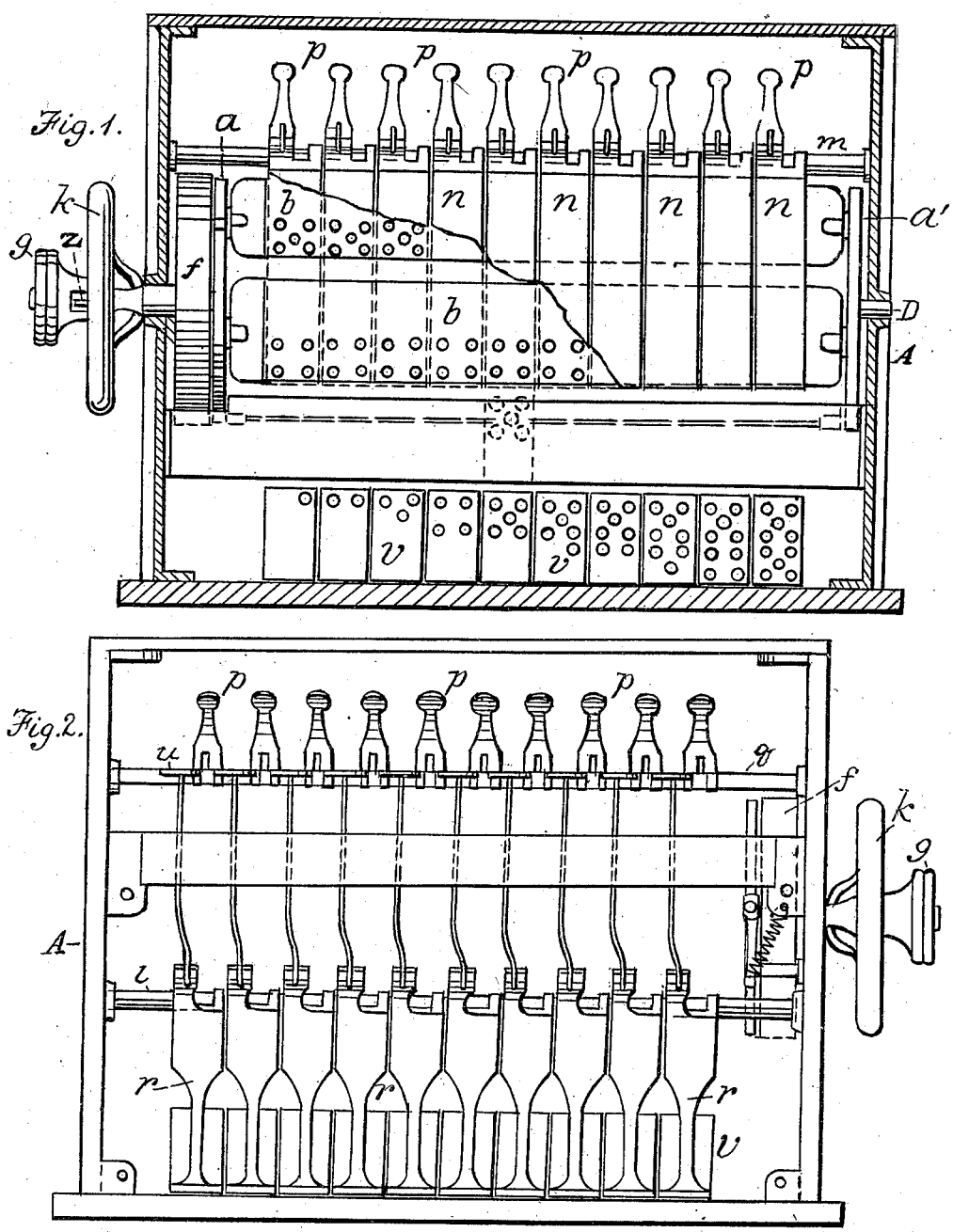
Witnesses:
Raymond Richardson.
H. A. Daniels
Inventor:
William Schmidt
By F. W. Willets & Co.
Attorneys No. 654,554. Patented July 24, 1900.
W. SCHMIDT.
CALCULATOR FOR EDUCATIONAL PURPOSES.
(Application filed Nov. 6, 1899.)
(No Model.) 2 Sheets—Sheet 2.

Witnesses:
Raymond Richardson
H. A. Daniels

Inventor:
William Schmidt
By A. W. Wills & Co.
Attorneys

UNITED STATES PATENT OFFICE.

WILLIAM SCHMIDT, OF LOWDEN, IOWA, ASSIGNOR OF ONE-HALF TO AUGUST NIETING, OF SAME PLACE.

CALCULATOR FOR EDUCATIONAL PURPOSES.

SPECIFICATION forming part of Letters Patent No. 654,554, dated July 24, 1900.

Application filed November 6, 1899. Serial No. 736,026. (No model.)

*To all whom it may concern:*

Be it known that I, WILLIAM SCHMIDT, a citizen of the United States, residing at Lowden, in the county of Cedar and State of Iowa, have invented certain new and useful Improvements in Calculators for Educational Purposes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to educational appliances; and it consists in an improved computator for educational purposes, as hereinafter described and claimed.

Figure 3:
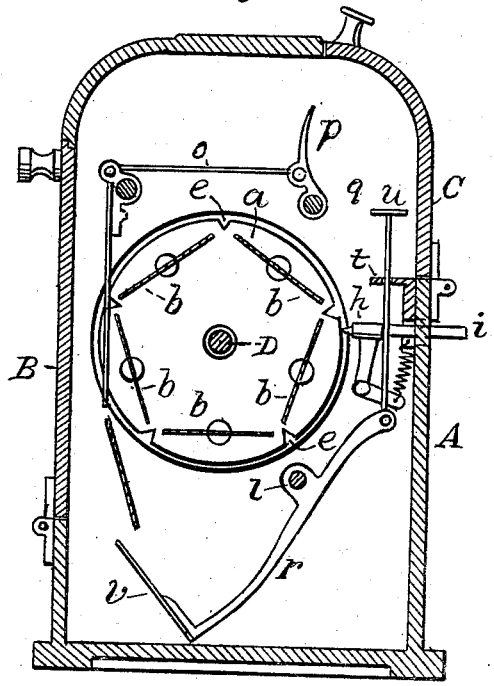
Figure 4:
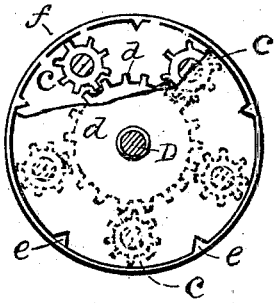
Figure 5:
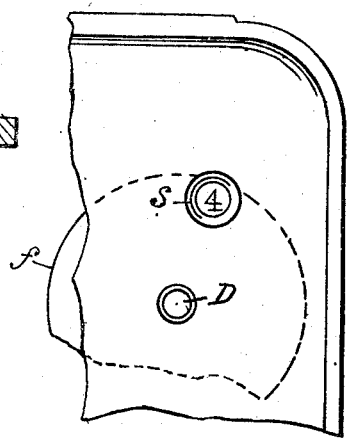
Figure 6:
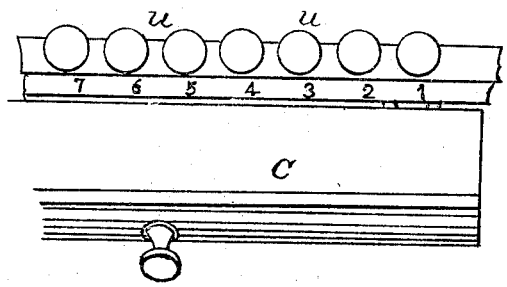

In the accompanying drawings, Figure 1 represents a front view of my improved computator, certain parts being removed. Fig. 2 is a rear view of the same. Fig. 3 is a vertical transverse section. Fig. 4 represents a master-wheel and gearing. Fig. 5 illustrates an indexed disk. Fig. 6 illustrates in plan view the numbered keys employed.

Referring to the drawings, A designates the casing, which has a door B at the front for exposing the interior to the view of the students, and also has a hinged cover C at the rear, so that the operator may have access to certain parts.

D indicates a longitudinal shaft extending through and having bearings in the casing. On the said shaft and near the ends thereof are secured two circular disks $a$ and $a'$, the disk $a$ having a series of notches $e$ in its periphery, which are spaced at equal distances apart for the purpose hereinafter mentioned. A series of plates or wings $b$ are pivotally connected at their extremities with the disks $a$ $a'$ at the peripheries of the said disks, the said wings being journaled to the disks. Five of these wings are shown, that being deemed a suitable number for the purpose of the invention. Each of the wings $b$ has certain numbers marked on each side of the wing, or such numbers may be indicated by spots, as shown, white spots on black wings being preferred for readily distinguishing them. Mechanism is provided for simultaneously reversing the positions and exposing to view either side of said wings, the latter being rotated sufficiently for the purpose. Each of the journals of the wings $b$ extends through the disk $a$ and has a pinion $c$ secured thereto. A master-wheel $d$, which is adapted to engage the said pinions, is loosely secured to the shaft D, so that when said master-wheel is partially rotated like motion is imparted to the several wings $b$ through the pinions $c$, thus reversing said wings in position.

Secured to the master-wheel $d$ and rotative therewith on the shaft D is a flanged indexed disk $f$, which has a circle of figures marked thereon near its periphery, which figures may be severally seen by the aperture $s$ in the casing to ascertain which series of numbers or indicating-marks are exposed.

The main shaft D, extending through the casing at one end, has secured to its extremity a hand-wheel $g$, by means of which said shaft, with the parts carried thereby, may be rotated. The shaft D may be locked in any required position by means of a spring-catch $h$, which is adapted to connect with the notched disk $a$, said catch having a finger-piece $i$, by means of which the operator may readily withdraw the locking pin or bolt from the notched disk $a$. Another hand-wheel $k$ is placed on the shaft D near the hand-wheel $g$ and is made fast to the indexed disk $f$, which is made fast to the master-wheel $d$. A stop $z$ is provided between the hand-wheels $g$ and $k$, which allows the master-wheel a limited rotary movement on the shaft independent of the latter. The stop $z$ is fast on or solid with the hub of the wheel $k$ and extends into a recess in the hub of the wheel $g$.

A shaft or rod $m$, parallel with the shaft D, is mounted in the casing at the front of the apparatus. To the shaft $m$ are loosely secured a series of leaves or covers $n$, which hang downward and extend along the wings $b$ from end to end, each of said leaves $n$ being adapted to cover or conceal from view certain numbers or marks indicating numbers on the wings $b$. Connected loosely with the tops of the leaves $n$ are the rods $o$, which extend over and across the wings $b$, and each of said rods has a bell-crank connection with a finger-piece $p$, a number of these finger-pieces corresponding with the number of leaves n being pivotally mounted on a fixed shaft or rod q, placed in position opposite to the rod m. The finger-pieces p and their connections with the leaves n are so constructed that when the operator turns down one of the pieces p one of the leaves n will be raised to a horizontal position and held in such position, thus exposing to view a set of indicating-marks on one of the wings b. When the raised leaf is to be closed, the operator raises the finger-piece slightly and the leaf closes by gravity.

A row of crooked levers r, corresponding in number with the leaves n, are pivotally connected with a fixed shaft l, located at the rear of the apparatus, the said levers being arranged in position corresponding with the leaves n. The levers r extend under the wings b to the front, and each of said levers carries on its free end a plate v, which bears a certain number of indicating marks or figures, spots being shown ranging from one to ten. At their rear ends the levers r are connected by rods which extend upward through a horizontal bar t with the keys u, which may be severally pressed by the operator sitting at the rear of the apparatus. The keys u are numbered on the edge of the casing where the cover C is hinged, as shown in Fig. 6, and when one of said keys is pressed down it raises one of the plates v at the front, so that it may be viewed in connection with certain indicating-marks on an exposed wing. (See Fig. 1.)

The teacher, sitting at the rear of the apparatus, exposes to the view of the pupils, who sit at the front, the spots indicating numbers on the wings by turning down the finger-pieces p, thus raising the leaves n, and by pressing down the keys u he raises the plates v and exposes the spots on said plates. Supposing the teacher wishes to illustrate by the addition of four and five, he turns the shaft D by hand-wheel g until the wing bearing spots in groups of four is at the front of the apparatus. He then presses down the key which is numbered 5, and one of the levers r will raise a plate v bearing a group of five spots to position directly below one of the leaves n. At the same time he draws the finger-piece next to the right of the key 5, raising the leaf and exposing to view a group of four spots on the wing, so that the two groups of four spots and five spots, respectively, can be seen one above another adjacent to each other. If the teacher wishes to illustrate the subtraction of five from nine, he takes his finger from key No. 5 and the lever r having the plate bearing the group of five spots will fall, withdrawing the five spots from view and leaving only the four spots on the wing exposed. A number of combinations of various numbers may be produced without turning either of the hand-wheels. When the teacher has operated the wings, using the sides which show groups of from one to five spots, he turns the hand-wheel k partially to the right, which action reverses the wings and brings in view a greater number of spots, the groups ranging from six to twenty, and many more combinations may be produced.

Multiplication with the assistance of the device is very simple. To multiply four by four, the teacher brings the wing bearing groups of four spots to the front and then handles the finger-pieces, raising the leaves n from four of said groups. Division is also quite simple. To illustrate the division of twenty by five, the teacher brings the wing with the row of fives to the front and, raising five levers, exposes five groups of five spots each. In case there is a remainder, as when twenty-seven is to be divided by five, the teacher exposes five groups of five spots and then by pressing key No. 2 he exposes the remainder—two—below the row of five spots.

I claim—

1. The combination with a rotative shaft and a series of wings carried by said shaft and having indicating-marks thereon, of a series of leaves or covers hung in front of said wings, finger-pieces and rods forming bell-crank connections with said leaves whereby the latter may be raised and secured in an elevated position substantially as set forth and described.

2. The combination with a rotative shaft and a series of reversible wings carried by said shaft, of a recessed hand-wheel, fast on said shaft, another hand-wheel which is loose on said shaft and is provided with a stop z which extends into a recess in the first-mentioned hand-wheel, an indexed disk and a master-wheel, both of which are rigidly connected with the last-mentioned hand-wheel and have a limited rotatory movement therewith on said shaft, and gearing connecting said master-wheel with said wings whereby the said wings may be reversed by the rotative movement of said master-wheel.

3. The combination with a rotative shaft and a series of wings carried by said shaft, of a series of movable leaves each of which is adapted to cover certain indicating-marks on said wings, a series of levers which are pivotally mounted and have plates bearing indicating-marks secured to their forward ends, each of said levers being directly in rear of one of said leaves, so that by pressing a key connected with one of said levers, the latter may be raised to expose to view certain marks on the plate carried by said lever, in connection with certain marks on one of said wings, the leaf covering said marks on the wing being raised.

In testimony whereof I have affixed my signature in presence of two witnesses.

WILLIAM SCHMIDT.

Witnesses:
JNO. P. BRAMMER,
HENRY RUPRECHT, Jr.